Nov. 18, 1969   H. WAGNER   3,479,034
DEVICE FOR AMUSEMENT OR EDUCATIONAL PURPOSES COMPRISING
MAGNETICALLY ATTRACTABLE MARKER MEANS
Filed Dec. 20, 1966

INVENTOR.
HEINZ WAGNER
BY Jacobi & Davidson
Attorneys

United States Patent Office 3,479,034
Patented Nov. 18, 1969

3,479,034
DEVICE FOR AMUSEMENT OR EDUCATIONAL PURPOSES COMPRISING MAGNETICALLY ATTRACTABLE MARKER MEANS
Heinz Wagner, 16 Kapfsteig, 8032 Zurich, Switzerland
Filed Dec. 20, 1966, Ser. No. 603,188
Claims priority, application Switzerland, Dec. 24, 1965, 17,835/65
Int. Cl. A63f 3/02; A63n 33/26
U.S. Cl. 273—131                                                        10 Claims

ABSTRACT OF THE DISCLOSURE

An amusement game or educational device incorporating a board or base plate upon which markers in the form of game pieces, figures, indicators or the like are placed. Both the base plate and the markers are formed at least partially of magnetic material, the base plate or the markers consisting at least partially of ferromagnetic material and the other element(s) at least partially of permanent magnetic material. Disposed over the base plate and at a distance therefrom is a cover plate of transparent material. The markers can be displaced by means of an external guide magnet acting through the cover plate so that such markers can be selectively positioned with respect to the base plate. The cover plate is mounted for movement to vary the spacing between the cover plate and the base plate, the outer limit of the range of adjustment being such as to render the guide magnet incapable of moving the markers.

Background of the invention

The present invention has reference to an improved amusement game or educational device of the type incorporating a board or base plate and markers arranged thereon for displacement, whereby the base plate or the markers are at least partially formed of ferromagnetic material and the other component at least partially of permanent magnetic material. In the context of this disclosure the term "marker" or any equivalent expression is used in its more liberal and broader sense to encompass indicators, signs, game pieces, figures, and generally all objects which are placed upon the base board and intended to be shifted thereupon.

Amusement games and educational devices having a base plate of ferromagnetic material and permanent magnetic indicators or figures displaceably arranged on such base plate are already known to the art. However, these prior art constructions are associated with certain drawbacks; specifically the indicators or figures can unintentionally be displaced if sufficient care is not taken, and further, unauthorized persons can displace these indicators or figures.

Summary of the invention

Accordingly, it is a primary object of the present invention to provide an improved amusement game or educational device which overcomes the drawbacks of the prior art structures.

Another, more specific object of this invention relates to a device of the type described in which the markers, such as indicators or figures, are protected against unintentional displacement or loss.

Still a further significant object of this invention is directed to an improved construction of amusement game or educational device which is relatively simple in construction, quite easy to use, safeguards against unauthorized and/or unintentional displacement of the markers, and further protects against loss of the markers.

Yet a further object of this invention has reference to an improved amusement game or educational device constructed in a manner to enable it to be used to play different games or provide instruction or education in various fields of learning.

Generally speaking, the inventive device is characterized by the feature that a transparent cover plate is arranged above the markers at a small spacing therefrom and substantially parallel to the board or base plate, such transparent cover plate being disposed in such a manner that these markers can be displaced through the cover plate with respect to the base plate by means of a guide magnet.

With appropriate construction of the inventive device, it is suitable, for instance, for use as a counting frame, to carry out word games, labyrinth games, or color games, for playing chess or checkers, or to be employed as a reading device. Moreover, when using an appropriate motif or design at the base plate it can be employed for instance in the geography lesson for inserting the names of places upon an unmarked map.

Advantageously, the base plate or board is formed of ferromagnetic material and the markers of permanent magnetic material. Also, the pole axes of the markers are preferably located substantially perpendicular to the base plate, but they may be arranged to extend substantially parallel to the base plate.

Brief description of the drawing

The invention will be better understood, and objects other than those set forth above will become apparent, when consideration is given to the following detailed description thereof. Such description makes reference to the annexed drawing wherein.

Description of the preferred embodiments

Figure 1:
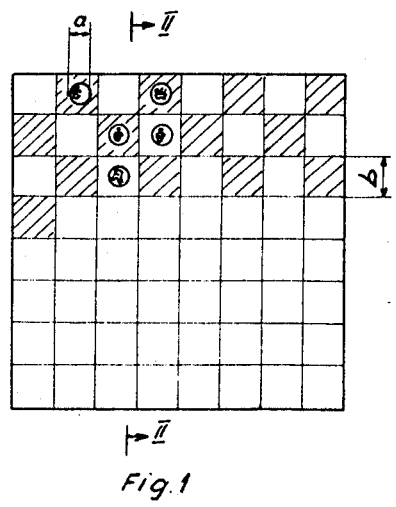
FIGURE 1 is a plan view of a first embodiment of inventive device used for playing chess for instance.
Figure 2:
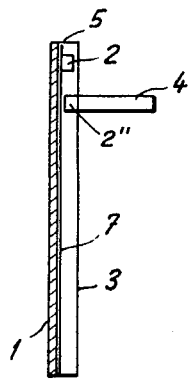
FIGURE 2 is a cross-sectional view of the device of FIGURE 1, on an enlarged scale, taken along the line II—II of FIGURE 1 and depicting the guide magnet.

The inventive device depicted in FIGURES 1 and 2 is designed for playing a game, here by way of example chess, and incorporates a base plate 1 formed of ferromagnetic material upon which are displaceably arranged permanent magnetic markers or figures 2. Above the markers 2 and at a small spacing therefrom and in substantial parallelism with the base plate 1 there is arranged a transparent cover plate member 3 in such a manner that the markers 2 can be displaced through the cover plate member 3 upon the base plate 1 by means of a suitable guide magnet 4. By means of the guide magnet 4 the markers 2 can be raised out of contact with the base plate 1, as shown at 2" in Figure 2, and displaced to the desired position.

It has been found to be advantageous to have the axes of the poles of the markers 2 extend substantially perpendicular to the base plate 1, so that these markers 2 can be easily displaced by means of the rod-like constructed guide magnet 4. Further, the base plate 1 is provided with a suitable frame 5 for supporting the transparent cover plate member 3. A suitable pattern or motif carrier 7, for instance consisting of paper, is arranged upon the base plate 1, and in this instance such pattern carrier 7 has formed thereon the design of a chess or checker field. It should be apparent that a chess game constructed according to FIGURE 1, with appropriate dimensioning, would be suitable as a pocket game.

During dimensioning of the device, it is advantageous that the diameter $a$ of the markers 2 is smaller than about half of the width $b$ of an individual square of the chess field. Naturally, the frame 5 can be constructed in such a manner that the markers 2 or the like can be introduced and removed between the base plate 1 and the cover plate member 3, as by means of a suitable closeable opening in the frame. However, it is advantageous to ensure that these markers 2 are not lost by small children, which can be easily safeguarded against by an appropriate arrangement of a lock. It is advantageous to have the base plate 1 detachable from the frame 5 so that the markers 2 as as well as the pattern carrier 7 can be removed and replaced easily, or a different pattern inserted.

When using the device for different games it would be possible for instance to provide markers 2 or the like which have been magnetized to different strengths so that when utilizing guide magnets 4 of different strengths only certain markers 2 can be displaced, which can be useful for limiting the power or capabilities of different persons participating in the game.

Furthermore, it is also possible to employ markers 2 or the like which are polarized in different directions and, as the case may be, also magnetized to different strengths, so that with one guide magnet 4 only certain markers 2 can be displaced.

Figure 3:
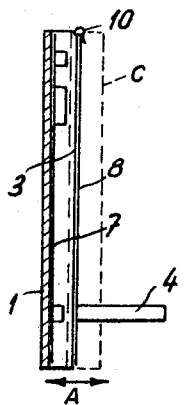
FIGURE 3 is a schematic cross-sectional view of a second embodiment of inventive device.

In the embodiment of inventive device depicted in FIGURE 3, the cover plate member 3 is arranged for lowering and raising movement. More precisely, it will be seen that the cover plate member 3 can be selectively moved between the illustrated full-line lowered position and the phantom-line upper position C shown in FIGURE 3, the directions of movement being indicated by the double-headed arrow A. If the spacing between the markers 2 and the cover plate member 3 is regulated to be sufficiently large, the markers 2 can no longer be displaced by means of the guide magnet 4. This can be of a particular advantage when the device is constructed as an educational apparatus in order to prevent the students from moving the markers without the permission of the instructor. A transparent sheet 8 which covers or only partially covers the cover plate member 3 can be clamped at the upper edge of the device, for instance by means of a suitable clamping mechanism 10 as shown in FIGURE 3.

Advantageously, the base plate 1 or the pattern carrier 7 is exchangeably arranged in the frame 5 so that the device can be used for different games or for different educational purposes. Thus, it is possible, for instance, to place into the device a flower pattern for a color game for a small child, for a school child a geography map without markings, wherein marked indicators or markers with the names of cities have to be displaced to the proper position on the map, or else, for an entertainment game there can be introduced a pattern of a chess or checker board.

Figure 4:
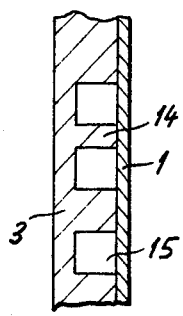
FIGURE 4 is a fragmentary, sectional view through a third embodiment having a cover plate constructed for performing a labyrinth game.

If the device is employed as a labyrinth game or as a counting frame, then, as shown in FIGURE 4, the cover plate member 3 is provided at its surface confronting the base plate 1 with webs 14 and grooves 15. These webs 14 and grooves 15 can extend transversely, longitudinally, or in both such directions, with respect to the cover plate member 3. Naturally, instead of the cover plate member 3 being provided with such webs 14 and grooves 15 it would equally be possible to arrange such at the base plate 1 in the manner just considered.

If the device is to be employed for a game concerning a fairytale, then for depicting the foreground an adhesive foil or sheet can be placed at the cover plate member 3 and for depicting the background a sheet or foil can be applied to the base plate 1, and figures such as for instance a wolf and a little red riding hood can be displaced therebetween. In this manner, it is possible to achieve interesting movement effects.

Figure 5:
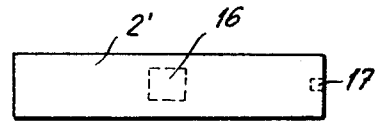
FIGURE 5 is an enlarged plan view of a marker to be used with any of the devices of the invention previously illustrated.

It is also possible to use oblong or rectangular markers as depicted in FIGURE 5. If such markers 2' are only provided with a single piece of permanent magnetic material 16 in their center, then with a corresponding position of the guide magnet 4 they have a tendency to rotate parallel to the base plate 1. In order to prevent this action it is advantageous to provide the markers 2', as shown in FIGURE 5, at a second location remote from the center with a piece of material 17 formed of ferromagnetic or permanent magnetic material. The first piece of material 16 at the central region and the second piece 17 are preferably dimensioned and magnetized in such a manner that the first piece 16 can be lifted by guide magnet 4, whereas the second piece 17 cannot be lifted by said guide magnet. Thereby, the undesired rotation of the marker 2' is avoided, since the magnetic force acting between the base plate 1 and the second piece 17 keeps the marker 2' down to the base plate at the end bearing piece 17.

Owing to the inventive construction of the amusement game or educational device it is not necessary to hold the device in horizontal or substantially horizontal position in order to prevent an unintentional displacement of the markers 2. On the contrary, the device can be used in all positions, particularly in a vertical position. Further, instead of arranging the game pattern at the base plate 1 it is also possible to apply any type of pattern, for instance a pattern for playing the game of Parcheesi, checkers or modified checkers, chess or the like, at the cover plate member 3 by means of a suitable crayon or the like.

It should be apparent from the foregoing detailed description that the objects set forth have been successfully achieved.

Accordingly, what is claimed is:

1. An amusement game or educational device comprising in combination a base plate means, at least one marker means displaceably arranged upon said base plate means, one of said aforementioned means being at least partially formed of ferromagnetic material and the other of said means at least partially of permanent magnetic material, a transparent cover plate member having its lower surface arranged above and at a small distance from the top of said marker means and in substantial parallelism with said base plate means, and at least one guide magnet member formed at least partially of permanent magnetic material, the magnetic properties and the dimensions of said base plate means, marker means, and guide magnet member as well as said small distance between the top of said marker means and said transparent cover plate member being related to one another in such a manner that said marker means can be at least partially lifted out of contact with said base plate means through the action of said guide magnet member upon contacting said transparent cover plate member, said transparent cover plate member being mounted for movement towards and away from said base plate means whereby said small distance between the top of said marker means and said transparent cover plate member may be varied between inner and outer limits, the outer limit of said small distance being such that said guide magnet member is unable to effect movement of said marker means.

2. An amusement game or educational device as defined in claim 1, wherein said base plate means is formed of ferromagnetic material and said marker means of permanent magnetic material.

3. An amusement game or educational device as defined in claim 2, wherein the pole axis of said marker means extends substantially perpendicular to said base plate means.

4. An amusement game or educational device as defined in claim 3, comprising a plurality of marker means which are polarized in different directions, whereby not all of said means are movable by the same guide magnet.

5. An amusement game or educational device as defined in claim 2, wherein said pole axis of said marker means extends substantially parallel to said base plate means.

6. An amusement game or educational device as defined in claim 2 comprising a plurality of marker means which are magnetized to different strengths, whereby not all of said means are movable by the same guide magnet.

7. An amusement game or educational device as defined in claim 1, wherein said base plate means is formed of permanent magnetic material and said marker means of ferromagnetic material.

8. An amusement game or educational device as defined in claim 1, wherein said cover plate member is constructed to receive a sheet thereon.

9. An amusement game or educational device as defined in claim 1, wherein said marker means is provided at its central region and at a second location remote therefrom with respective pieces of material formed of magnetic material, the piece at said second location being so strongly attracted to the base plate means that it cannot be separated therefrom by said guide magnet.

10. An amusement game or educational device as defined in claim 9, wherein said piece of material at said second location is situated at a point furthest from the piece of material at said central region.

References Cited

UNITED STATES PATENTS

| | | |
|---|---|---|
| 611,545 | 9/1898 | Yarnall. |
| 1,225,787 | 5/1917 | Diehl |
| 2,339,209 | 1/1944 | Vensel _____ 273—95 |
| 2,525,738 | 10/1950 | Tormey _____ 273—137 X |
| 2,590,002 | 3/1952 | Frazier _____ 46—239 X |
| 2,782,038 | 2/1957 | Engel _____ 273—134 |
| 2,814,909 | 12/1957 | Knowles _____ 46—240 |
| 2,956,807 | 10/1960 | Luchsinger _____ 46—239 X |
| 2,998,973 | 9/1961 | Schaper _____ 273—1 |
| 3,195,894 | 7/1965 | Alsaker et al. _____273—136 X |
| 2,665,913 | 1/1954 | Hlavac _____ 273—137 |
| 2,995,372 | 8/1961 | Hines _____ 273—87 |
| 3,237,941 | 3/1966 | Vincent. |

FOREIGN PATENTS

| | | |
|---|---|---|
| 1,992 | 1868 | Great Britain. |
| 160,473 | 5/1933 | Switzerland. |

DELBERT B. LOWE, Primary Examiner

U.S. Cl. X.R.

35—28, 40, 48; 46—240; 273—1, 137